United States Patent
Li et al.

(10) Patent No.: US 8,748,557 B2
(45) Date of Patent: Jun. 10, 2014

(54) EXTREME LOW FORMALDEHYDE EMISSION UF RESIN WITH A NOVEL STRUCTURE AND ITS PREPARATION

(75) Inventors: Xiao-Yu Li, Beijing (CN); Jun Ye, Beijing (CN); Hai-Qiao Wang, Beijing (CN); Teng Qiu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 168 days.

(21) Appl. No.: 13/220,386

(22) Filed: Aug. 29, 2011

(65) Prior Publication Data

US 2012/0088897 A1 Apr. 12, 2012

(30) Foreign Application Priority Data

Oct. 12, 2010 (CN) .......................... 2010 1 0503710

(51) Int. Cl.
*C08G 12/12* (2006.01)
*C08G 12/34* (2006.01)

(52) U.S. Cl.
USPC ........... 528/259; 528/256; 528/254; 528/245; 528/486; 528/502 R; 528/503

(58) Field of Classification Search
USPC ...... 528/259, 256, 254, 245, 486, 502 R, 503
See application file for complete search history.

(56) References Cited

FOREIGN PATENT DOCUMENTS

WO 94/04584 3/1994

*Primary Examiner* — Duc Trong
(74) *Attorney, Agent, or Firm* — J.C. Patents

(57) ABSTRACT

The present invention relates to an extreme low formaldehyde emission UF resin with a novel structure, and a process for its preparation. This UF resin is produced from formaldehyde, urea, a long chain multi-aldehyde prepolymer, and some modifiers. Its process follows three steps: weak caustic, weak acid and weak caustic. By using this prepolymer, the modified UF resin has stable alkyl ether structure, and the residual aldehyde groups on the UF polymer chain could accelerate cross-linking instead of dissociative formaldehyde. The UF resin made from this invention has extreme low dissociative formaldehyde and simple technology. The boards produced from this resin have good physical performance and water resistance. Moreover, the formaldehyde emission of the boards is extreme low, achieving Japan F☆☆☆☆ grade, the average emission value ≤0.3 mg/L.

8 Claims, No Drawings

US 8,748,557 B2

EXTREME LOW FORMALDEHYDE EMISSION UF RESIN WITH A NOVEL STRUCTURE AND ITS PREPARATION

CROSS-REFERENCE TO RELATED APPLICATION

This application claims the priority benefits of Chinese application No. 201010503710.8 filed on Oct. 12, 2010, the contents of which are hereby incorporated by reference in its entirety.

BACKGROUND OF THE INVENTION

1. Technical Field

The invention introduces an extreme low formaldehyde emission urea-formaldehyde (UF) resin with a novel structure and its preparation method which belongs to the timber processing industry.

2. Description of Related Art

In 2009 Chinese artificial board production is about 115,466,500 m³. China has become the biggest artificial boards producing country, and also its wood adhesives yield, especially the UF resin yield is the biggest in the world. In this year, the wood adhesive yield of China was above 8 million ton, and the UF resin was more than 6.5 million ton above 80%. With the economic development and the strength of environmental concern, many countries such as Europe, American, Japan, etc., established more and more strict requirements on the poison gas emission of products, especially the formaldehyde emission of artificial boards. It made a great challenge to the boards manufacturing enterprises in China.

The UF resin has many advantages, such as low cost, abundant raw materials source, good physical performance, fast solidification and colorless glue line. Compared with other wood adhesives, its lowest cost is inapproachable. But a well-known problem of UF resin is its emission of formaldehyde, both from the adhesives and the glued products, which will make great air pollution. Because the products made from UF resin are usually used in interior, it is extremely harmful to human healthy. This problem is getting more and more attention, and many regulations are carried out, so the low formaldehyde released boards must be developed. In 2001 China has set $E_1$, $E_2$ grade for artificial boards in standard 《Interior decoration material—the limited value of formaldehyde emission from artificial boards and their products》 (GB18580-2001). So only the environmental and poison less UF resin can satisfy the market requirement both from inner and aboard.

Traditional methods to modify the UF resin are reducing the dissociative formaldehyde content or adding the formaldehyde scavenger. The scavenger will lose its efficiency after a short period, and the unstable structures such as dimethylene ether and hydroxymethyl also exist in the glued products which could decompose and release formaldehyde continuously, so this method could not solve the problem radically. To modify these unstable structures is the essential solution.

There are many methods to modify UF resin, and about dialdehyde monomer used in UF resin to improve its physical and anti-water performance, some researches have been studied. In 1978, William used glyoxal, phosphoric acid and oxalic acid as cross-linking agent to improve the dynamic intensity of UF foam. WO94/04584 synthesized formaldehyde, urea, dialdehyde and some amine compound under acid condition to get some cyclic urea structure to improve the physical performance of UF resin. But the dissociative formaldehyde content of resin is high, and the formaldehyde emission of its board products only achieved $E_1$ quality. In these methods, the unstable structures to release formaldehyde also existed. So we should synthesis UF resin with low formaldehyde release and good performance form the structure design.

BRIEF SUMMARY OF THE INVENTION

This present invention relates to UF resin which is produced from formaldehyde, urea, a long chain multi-aldehyde prepolymer, modifier, caustic catalyst, and acid catalyst, wherein the mole ratio of formaldehyde to urea is in the range of 0.95-1.05, and urea 120 weight parts, 37% formaldehyde 154-170 weight parts, long chain multi-aldehyde prepolymer 10-100 weight parts, modifiers 1-5 weight parts, caustic catalyst 0.02-0.05 weight parts, and acid catalyst 0.02-0.05 weight parts are used.

The long chain multi-aldehyde prepolymer is synthesized from glyoxal and glutaraldehyde mixture or from glutaraldehyde itself. And the reacting process is as following: A glyoxal and glutaraldehyde mixture or glutaradehyde itself in 100 weight parts and a catalyst in 2-10 weight parts are added to a reactor to react, and the reaction temperature is 20-80° C., and the reacting time is 0.5-4 h, and then 5 weight parts stabilizer is added. The catalyst used in the method according in the invention is caustic solution, such as soda, ammonia, sodium hydroxide, potassium carbonate, potassium hydroxide. The stabilizer is acid solution, such as boric acid, ethylic acid, formic acid.

The acid catalyst is acid solution, such as formic acid, sulfuric acid, hydrochloric acid.

The caustic catalyst is caustic solution, such as sodium hydroxide, triethanolamine, hexamine. The modifier could be borax, melamine, polyving akohol.

The synthesize process is the following stage:

(1) 37% formaldehyde 154-170 weight parts, urea 70 weight parts, and modifiers 1-5 weight parts were heated to 90° C., the pH was adjusted to 8.5 by caustic catalyst.

(2) After reacting 50 min under 90° C., the pH was adjusted to 5.0 by acid catalyst. And then 30 weight parts urea was added.

(3) After reacting 5 min, long chain multi-aldehyde prepolymer in 10-100 weight parts was added, and the pH was adjusted to 4.6.

(4) After reacting under 80° C. for 20 min, the pH was adjusted to 7.2, and 20 weight parts urea was added.

(5) After reacting under 70° C. for 30 min, the pH was adjusted to 8.0, and the final resin was obtained after the temperature was cooled to 40° C.

DETAILED DESCRIPTION OF THE INVENTION

Example 1

Long chain multi-aldehyde prepolymer synthesis: 100 g of 50% glutaraldehyde, 10 g sodium carbonate (catalyst) were reacted under 20° C. for 4.0 h, and then 5 g formic acid (stabilizer) was added.

UF resin (F/U=1.05:1) synthesis: a) 170 g (2.1 mol) of 37% formaldehyde solution, 70 g (1.17 mol) of urea, 1.0 g borax were mixed with stirring and reflex condenser. And the pH of the system was adjusted to 8.5 by adding 20 wt % sodium hydroxyl solution. b) After reacting 50 min under 90° C., the pH was adjusted to 5.0 by adding 30 wt % formic acid solution. And then 30 g (0.5 mol) urea was added. c) After reacting 5 min, long chain multi-aldehyde prepolymer 100 g was added, and the pH was adjusted to 4.6. d) After reacting under 80° C. for 20 min, the pH was adjusted to 7.2, and 20 g (0.33 mol) urea was added. e) After reacting under 70° C. for 30 min, the pH was adjusted to 8.0, and the final resin was obtained after the temperature was cooled to 40° C.

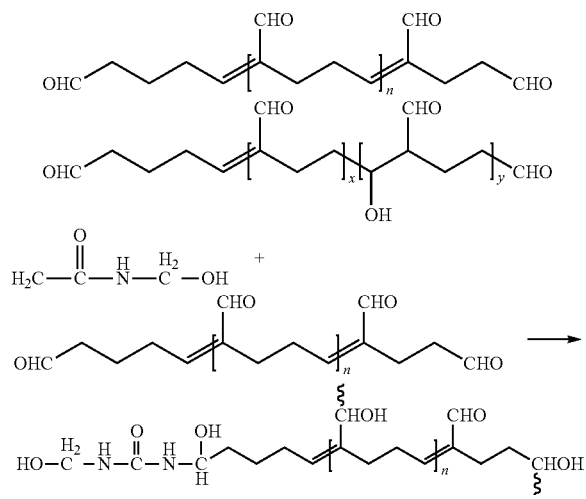

Example 2

The synthesis of the long chain multi-aldehyde prepolymer was changed by adding the catalyst of 5 g sodium carbonate, and other implementation is the same as Example 1.

Example 3

The synthesis of the long chain multi-aldehyde prepolymer was changed by adding the catalyst of 2 g sodium carbonate, and other implementation is the same as Example 1.

Example 4

The synthesis of the long chain multi-aldehyde prepolymer was changed to react under 40° C. for 2 h, and other implementation is the same as Example 1.

Example 5

The synthesis of the long chain multi-aldehyde prepolymer was changed to react under 60° C. for 1 h, and other implementation is the same as Example 1.

Example 6

The synthesis of the long chain multi-aldehyde prepolymer was changed to react under 80° C. for 0.5 h, and other implementation is the same as Example 1.

Example 7

The synthesis of the long chain multi-aldehyde prepolymer was changed by substituting the catalyst sodium carbonate to ammonia, and other implementation is the same as Example 1.

Example 8

The synthesis of the long chain multi-aldehyde prepolymer was changed by substituting the catalyst sodium carbonate to sodium hydroxide, and other implementation is the same as Example 1.

Example 9

The synthesis of the long chain multi-aldehyde prepolymer was changed by substituting the catalyst sodium carbonate to potassium carbonate, and other implementation is the same as Example 1.

Example 10

The synthesis of the long chain multi-aldehyde prepolymer was changed by substituting the catalyst sodium carbonate to potassium hydroxide, and other implementation is the same as Example 1.

Example 11

The synthesis of the long chain multi-aldehyde prepolymer was changed by substituting the stabilizer formic acid to ethylic acid, and other implementation is the same as Example 1.

Example 12

The synthesis of the long chain multi-aldehyde prepolymer was changed by substituting the stabilizer formic acid to boric acid, and other implementation is the same as Example 1.

Example 13

The synthesis of the long chain multi-aldehyde prepolymer was changed by using the glyoxal and glutaraldehyde mixture as the raw material, and their mole ratio was 0.5:1, and other implementation is the same as Example 1.

Example 14

The synthesis of the long chain multi-aldehyde prepolymer was changed by using the glyoxal and glutaraldehyde mixture as the raw material, and their mole ratio was 1:1, and other implementation is the same as Example 1.

Example 15

The synthesis of the long chain multi-aldehyde prepolymer was changed by using the glyoxal and glutaraldehyde mixture as the raw material, and their mole ratio was 2:1, and other implementation is the same as Example 1.

Example 16

The synthesis of the UF resin was changed by adding the long chain multi-aldehyde prepolymer 80 g, and other implementation is the same as Example 1.

Example 17

The synthesis of the UF resin was changed by adding the long chain multi-aldehyde prepolymer 50 g, and other implementation is the same as Example 1.

Example 18

The synthesis of the UF resin was changed by adding the long chain multi-aldehyde prepolymer 30 g, and other implementation is the same as Example 1.

Example 19

The synthesis of the UF resin was changed by adding the long chain multi-aldehyde prepolymer 10 g, and other implementation is the same as Example 1.

Example 20

The synthesis of the UF resin was changed by adding the modifier borax 3.0 g, and other implementation is the same as Example 1.

Example 21

The synthesis of the UF resin was changed by adding the modifier borax 5.0 g, and other implementation is the same as Example 1.

Example 22

The synthesis of the UF resin was changed by adding the modifier melamine 1.0 g, and other implementation is the same as Example 1.

Example 23

The synthesis of the UF resin was changed by adding the modifier melamine 3.0 g, and other implementation is the same as Example 1.

Example 24

The synthesis of the UF resin was changed by adding the modifier melamine 5.0 g, and other implementation is the same as Example 1.

Example 25

The synthesis of the UF resin was changed by adding the modifier polyvinyl alcohol 1.0 g, and other implementation is the same as Example 1.

Example 26

The synthesis of the UF resin was changed by adding the modifier polyvinyl alcohol 3.0 g, and other implementation is the same as Example 1.

Example 27

The synthesis of the UF resin was changed by adding the modifier polyvinyl alcohol 5.0 g, and other implementation is the same as Example 1.

Example 28

The synthesis of the UF resin was changed by adding formaldehyde 162 g, and the mole ratio of formaldehyde to urea was changed to 1:1, and other implementation is the same as Example 1.

Example 29

The synthesis of the UF resin was changed by adding formaldehyde 154 g, and the mole ratio of formaldehyde to urea was changed to 0.95:1, and other implementation is the same as Example 1.

Comparison 1

The synthesis of the UF resin was not adding the long chain multi-aldehyde prepolymer, and other implementation is the same as Example 1.

Comparison 2

The synthesis of the UF resin was not adding the modifier, and other implementation is the same as Example 1.

TABLE 1

The performance of UF resin of Exemple1

| Index | Unit | Performance | Test standard |
|---|---|---|---|
| Aspect | | White uniform solution | GB/T14074.1-1993 |
| pH | | 7.5 | GB/T14074.4-1993 |
| Solid content | % | 63.2 | GB/T14074.5-1993 |
| Dissociative formaldehyde content | % | 0.076 | GB/T14074.16-1993 |
| Viscosity | cP | 284 | GB/T14074.3-1993 |
| Storage | day | >15 | GB/T14074.9-1993 |
| Bonding strength | MPa | 0.813 (boards tested after soaking in 63 C.° hot water for 3 h) | GB/T 9846-2004 |
| Formaldehyde emission | mg * L$^{-1}$ | 0.257 | GB/T 17657-1999 |

TABLE 2

The performance comparison

| | Index | | |
|---|---|---|---|
| Sample | Storage/d | Bonding strength/ MPa | Formaldehyde emission/ mg * L$^{-1}$ |
| Example 1 | >15 | 0.813 | 0.257 |
| Example 2 | >20 | 0.742 | 0.31 |
| Example 3 | >30 | 0.61 | 0.358 |
| Example 4 | >15 | 0.834 | 0.264 |
| Example 5 | >15 | 0.86 | 0.24 |
| Example 6 | >10 | 0.923 | 0.213 |
| Example 7 | >30 | 0.673 | 0.362 |
| Example 8 | >10 | 0.95 | 0.207 |
| Example 9 | >20 | 0.821 | 0.268 |
| Example 10 | >10 | 0.961 | 0.183 |
| Example 11 | >20 | 0.734 | 0.324 |
| Example 12 | >20 | 0.71 | 0.392 |
| Example 13 | >30 | 0.782 | 0.331 |
| Example 14 | >30 | 0.71 | 0.356 |
| Example 15 | >30 | 0.63 | 0.407 |
| Example 16 | >15 | 0.775 | 0.316 |
| Example 17 | >30 | 0.72 | 0.43 |
| Example 18 | >30 | 0.64 | 0.507 |
| Example 19 | >40 | 0.583 | 0.626 |
| Example 20 | >30 | 0.83 | 0.28 |
| Example 21 | >50 | 0.77 | 0.247 |
| Example 22 | >15 | 0.86 | 0.267 |
| Example 23 | >10 | 0.706 | 0.26 |
| Example 24 | >3 | 0.63 | 0.225 |
| Example 25 | >30 | 0.61 | 0.269 |
| Example 26 | >50 | 0.53 | 0.335 |

TABLE 2-continued

The performance comparison

| Sample | Storage/d | Bonding strength/ MPa | Formaldehyde emission/ mg * L$^{-1}$ |
|---|---|---|---|
| Example 27 | >60 | 0.31 | 0.443 |
| Example 28 | >10 | 0.75 | 0.184 |
| Example 29 | >7 | 0.632 | 0.106 |
| Comparison 1 | >30 | 0.38 | 0.814 |
| Comparison 2 | >10 | 0.827 | 0.352 |

What is claimed is:

1. A UF resin produced from formaldehyde, urea, a long chain prepolymer with multi-aldehyde groups, caustic catalyst, and acid catalyst according to the following proportion: 37% formaldehyde: 154-170 weight parts, urea: 120 weight parts, the long chain prepolymer: 10-100 weight parts, the caustic catalyst: 0.02-0.05 weight parts, and the acid catalyst: 0.02-0.05 weight parts, wherein molecular chains of the UF resin contain first units formed from formaldehyde and urea and second units formed from the long chain prepolymer with multi-aldehyde groups, and the mole ratio of formaldehyde to urea is in the range of 0.95-1.05;

wherein the long chain prepolymer with multi-aldehyde groups is synthesized from glyoxal and glutaraldehyde or from glutaraldehyde itself by reacting a mixture of glyoxal and glutaraldehyde or glutaradehyde itself in the presence of a catalyst.

2. The UF resin as claimed in claim 1, wherein the process for preparing the UF resin comprises the following steps:
   (1) 37% formaldehyde 154-170 weight parts, urea 70 weight parts, and modifier 1-5 weight parts are heated to 90° C., the pH is adjusted to 8.5 by caustic catalyst;
   (2) after reacting 50 min under 90° C., the pH is adjusted to 5.0 by acid catalyst, and then 30 weight parts urea is added;
   (3) after reacting 5 min, long chain multi-aldehyde prepolymer in 10-100 weight parts is added, and the pH is adjusted to 4.6;
   (4) after reacting under 80° C. for 20 min, the pH is adjusted to 7.2, and 20 weight parts urea is added;
   (5) after reacting under 70° C. for 30 min, the pH is adjusted to 8.0, and the UF resin is obtained after the temperature is cooled to 40° C.

3. The UF resin as claimed in claim 1, wherein the acid catalyst is selected form the group consisting of formic acid, sulfuric acid, and hydrochloric acid.

4. The UF resin as claimed in claim 1, wherein the caustic catalyst is selected form the group consisting of sodium hydroxide, triethanolamine, and hexamine.

5. The UF resin as claimed in claim 1, wherein, in the production of the UF resin, 1-5 weight parts of a modifier are used based on 120 weight parts of urea, and the modifier is selected form the group consisting of borax, melamine, and polyving akohol.

6. The UF resin as claimed in claim 1, wherein, in the synthesis of the long chain prepolymer with multi-aldehyde groups, for 100 weight parts of the mixture of glyoxal and glutaraldehyde or glutaradehyde itself 2-10 weight parts of the catalyst are used, and the catalyst is selected form the group consisting of soda, ammonia, sodium hydroxide, potassium carbonate, and potassium hydroxide.

7. The UF resin as claimed in claim 1, wherein the synthesis of the long chain prepolymer with multi-aldehyde groups is conducted at a temperature of 20-80° C. for 0.5-4 h.

8. The UF resin as claimed in claim 7, wherein, after the synthesis of the long chain prepolymer with multi-aldehyde groups is conducted at a temperature of 20-80° C. for 0.5-4 h, 5 weight parts of a stabilizer are added based on 100 weight parts of the mixture of glyoxal and glutaraldehyde or glutaradehyde itself, and the stabilizer is selected form the group consisting of boric acid, ethylic acid, and formic acid.

* * * * *